US011811758B1

(12) United States Patent
Lester et al.

(10) Patent No.: US 11,811,758 B1
(45) Date of Patent: *Nov. 7, 2023

(54) SYSTEMS AND METHODS FOR ELECTRONIC ENROLLMENT AND AUTHENTICATION

(71) Applicant: United Services Automobile Association (USAA), San Antonio, TX (US)

(72) Inventors: Michael Wayne Lester, Fair Oaks Ranch, TX (US); Thomas Bret Buckingham, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,171

(22) Filed: Mar. 8, 2023

Related U.S. Application Data

(63) Continuation of application No. 17/711,725, filed on Apr. 1, 2022, now Pat. No. 11,611,555, which is a continuation of application No. 16/529,507, filed on Aug. 1, 2019, now Pat. No. 11,297,056.

(60) Provisional application No. 62/713,331, filed on Aug. 1, 2018.

(51) Int. Cl.
*G06F 3/0484* (2022.01)
*H04L 9/40* (2022.01)
*G06F 9/451* (2018.01)

(52) U.S. Cl.
CPC .......... *H04L 63/0861* (2013.01); *G06F 9/451* (2018.02); *H04L 63/083* (2013.01); *G06F 3/0484* (2013.01)

(58) Field of Classification Search
None
See application file for complete search history.

(56) References Cited

U.S. PATENT DOCUMENTS

| 9,210,156 | B1 * | 12/2015 | Little | G06F 21/34 |
|---|---|---|---|---|
| 10,032,042 | B1 * | 7/2018 | Eckel | G06Q 30/018 |
| 2010/0262668 | A1 | 10/2010 | Piett | |
| 2011/0047608 | A1 | 2/2011 | Evenberg | |
| 2013/0247159 | A1 | 9/2013 | Hall | |
| 2017/0257358 | A1 | 9/2017 | Ebrahimi | |
| 2018/0158054 | A1 | 6/2018 | Ardashev | |
| 2018/0316671 | A1 * | 11/2018 | Brown | H04L 63/0884 |
| 2020/0007333 | A1 * | 1/2020 | Young | H04L 9/50 |

* cited by examiner

*Primary Examiner* — Tuan S Nguyen
(74) *Attorney, Agent, or Firm* — Fletcher Yoder, P.C.

(57) ABSTRACT

Current embodiments relate to proofing and authenticating digital access and/or control requests. By communicating with various service providers, automatic proofing and/or enrollment for authentication of digital access and/or control services may be provided.

20 Claims, 4 Drawing Sheets

SYSTEMS AND METHODS FOR ELECTRONIC ENROLLMENT AND AUTHENTICATION

CROSS-REFERENCES TO RELATED APPLICATIONS

The present disclosure is related to and claims priority to U.S. patent application Ser. No. 17/711,725, titled "Systems and Methods for Electronic Enrollment and Authentication," which was filed on Apr. 1, 2022, and U.S. patent application Ser. No. 16/529,507, now U.S. Pat. No. 11,297,056, titled "Systems and Methods for Electronic Enrollment and Authentication," which was filed on Aug. 1, 2019, which is related to and claims priority to U.S. Provisional Patent Application Ser. No. 62/713,331, titled "Systems and Methods for Electronic Enrollment and Authentication," which was filed on Aug. 1, 2018, each of which is herein incorporated by reference in its entirety for all purposes.

BACKGROUND

The present disclosure relates generally to systems and methods for electronic enrollment and authentication. More specifically, the present disclosure relates to systems and methods for an authentication ecosystem that provides increased digital protection. In some embodiments, the authentication ecosystem may use strong proofing to provide automatic back-end retrieval of enrollment and/or authentication information, significantly reducing the interaction required by an end user during the electronic enrollment and/or authentication processes.

As electronic transactions become increasingly popular within virtually every enterprise, fraudulent or otherwise erroneous transactions have increased, resulting in significant time and monetary costs. As information relating to an electronic user is gathered and aggregated, it is possible to authenticate, to a high-level of confidence, users that have been active members. This aggregation process typically takes quite some time, as it may take a significant amount of time to gather enough data to obtain a sufficient confidence interval for the authentication.

Because there is little to no information about new users available at a time of enrollment and/or logic, authentication is much more difficult for new customers. Further, enrollment processes often require significant amounts of information, in order to authenticate that a user is who they say they are. Thus, the enrollment process has traditionally been quite burdensome to users, requiring a significant data entry process for the new user. For example, it may take approximately 20 active interactions (e.g., clicks on an interactive website) to become a new member of an electronic enterprise. After that, it takes approximately another 11 active interactions (e.g., clicks) to purchase a product from the enterprise. Accordingly, the user may be subjected to approximately 31 pages of information to join an enterprise and obtain a new product. As may be appreciated, this creates a significant barrier to conversion of a customer. Accordingly, the systems and procedures disclosed herein provide techniques for simplifying this process, resulting in a much simpler and more desirable enrollment and/or authentication process.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The techniques provided herein enhance the enrollment and/or authentication user experience by generally requiring significantly less information to be provided by the user during new member enrollment and purchasing. For example, by using back-end processing to retrieve information that is typically entered by the user, the number of pages of information required by the user may be reduced from approximately 31 pages of information down to 3 pages of information. Further, because the information is not manually entered, the data may have a higher level of trust, as it is retrieved directly from back-end data sources. Further, as discussed below, the proofing, enrollment and authentication pieces may be performed jointly, strengthening each of these processes.

Figure 1:
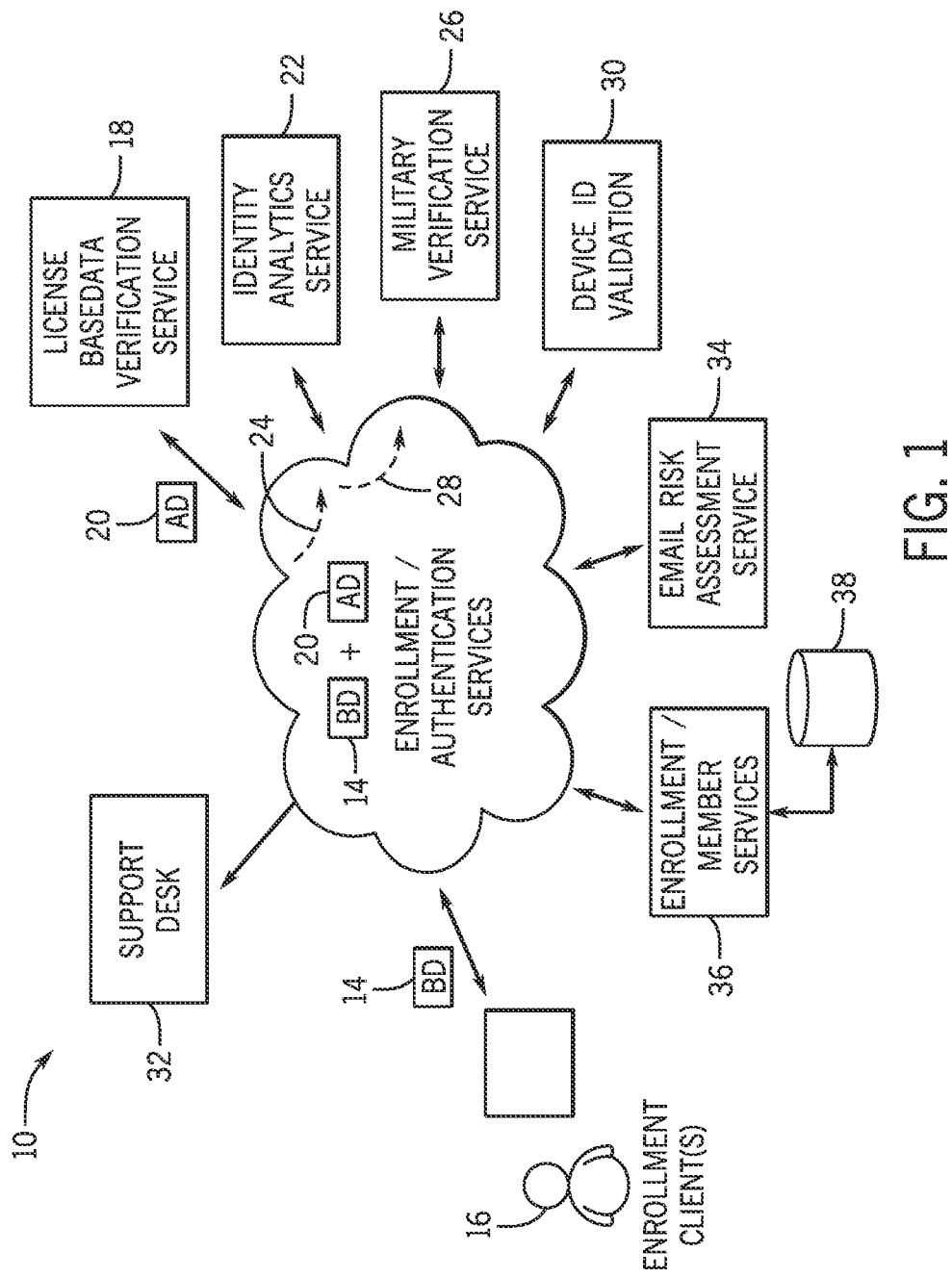
FIG. 1 illustrates a block diagram of an authentication system that may be used to facilitate electronic enrollment and/or verification processes, in accordance with embodiments described herein.

With the foregoing in mind, FIG. 1 illustrates a block diagram of an authentication system 10 that may be used to facilitate electronic enrollment and/or verification processes, in accordance with embodiments described herein. The authentication system 10 may include enrollment/authentication services 12 that receive a reduced amount of base data 14 from an enrollment client 16. The base data 16 provides data that, when verified, provides confidence that a user of the enrollment client 16 is who they say they are. For example, in some embodiments, the base data 16 may be an image or images of an issued identification document, such as a state issued driver's license, a government issued passport, etc. As will be discussed in more detail below, extensive validity checks regarding the base data may be facilitated by the enrollment/authentication services 12. For example, the license/base data verification service 18 may be used to verify the base data 14. Further, additional data 20 related to the user that is associated with the base data at the license/base data verification service 18 may be provided to the enrollment/authentication services 12.

Using the minimal amount of base data 14 provided from the enrollment client 16 and the additional data 20 received from the license/base data verification service 18, additional data queries for supplemental data may be requested by the enrollment/authentication services 12, enabling the enrollment/authentication services 12 to derive a significant amount of secondary data from other data sources communicatively coupled to the enrollment/authentication services 12. For example, portions of the base data 14 and the additional data 20 may be provided in a request to identity analytics services 22 to obtain secondary information related to the user, as indicated by arrow 24. Further, additional verification and or retrieval of additional secondary data may be provided by military verification services 26, as indicated by arrow 28.

Verifying that the user identified by the base data 14, the additional data 20, and/or the secondary data is associated with the enrollment client 16 may provide additional confidence that the enrollment should proceed automatically. For example, in some embodiments, the enrollment/authentication services 12 may only implement automatic enrollment when the enrollment/authentication services 12 are able to ascertain with a particular level of confidence that the data received is valid and accurate. In some embodiments, when the enrollment/authentication services are unable to attain a confidence threshold for enrollment, the enrollment may be paused, triggering manual intervention (e.g., via a support desk 32). To ensure the user is who they say they are, additional validation checks may be performed. For example, identifying information related to the enrollment client 16 may be provided to the device identification validation service 30 to confirm whether the enrollment client 16 is somehow associated with the user that is attempting to enroll. For example, the device identification services may determine whether a cellular service account holder for the enrollment client 16 is the user or someone associated with the user (e.g., a family member, roommate).

Additionally, an email risk assessment service 34 may be used to perform a check to see if the email addresses used are associated with prior fraud. For example, the email risk assessment service 34 may determine particular email domains that are typically associated with fraud, particular email addresses that are associated with fraud, or vice versa.

When the confidence threshold is attained, the enrollment/authentication services 12 may trigger automatic enrollment via enrollment/member services 36. The enrollment/member services 36 may result in enrollment data (e.g., accounts, PINs) being added to an enrollment data store 38.

Figure 2:
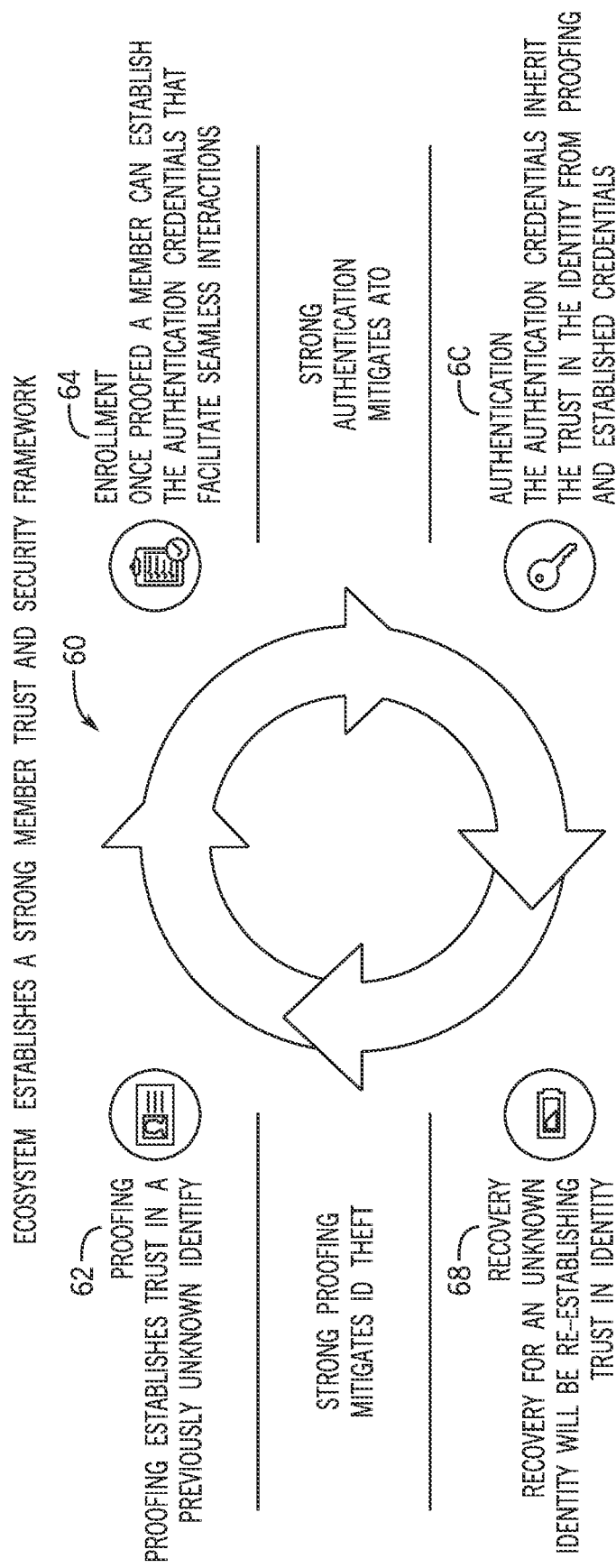
FIG. 2 is a flowchart, illustrating an enrollment/authentication cycle that may be implemented by the authentication system of FIG. 1, in accordance with embodiments described herein.

Turning now to a more-detailed discussion of actions performed by the enrollment/authentication services 24, FIG. 2 is a flowchart, illustrating enrollment/authentication actions 60 that may be implemented by the authentication system 10 of FIG. 1, in accordance with embodiments described herein.

The actions 60 begin with proofing 62. Proofing establishes trust in a previously unknown identity (e.g., the identity of a new user). The current techniques utilize strong proofing techniques to mitigate against identity theft. For example, by utilizing a driver's license or other form of identity verification during the enrollment proofing, decreased identity theft may occur, as compared to manual entry of identity information, which may be easily obtained and/or fraudulently entered. Driver's License and Government IDs may be validated electronically against authoritative sources such as the Department of Motor Vehicles.

Because the proofing process is strengthened, the enrollment action 64 may be streamlined. For example, using the driver's license (or other form of identity verification) as a form of proof of identity, the back-end systems may auto-populate user enrollment information, requiring less enrollment interaction from the potential new member. Not only does this result in a more desirable user experience than standard graphical user interfaces by requiring significantly less interaction by a user during the enrollment process, but the auto-populated data may also be significantly more reliable, as manually entered erroneous and/or fraudulent data may be avoided.

The enrollment/authentication services 24 may also perform authentication actions 66. Strong authentication criteria may reduce account takeover (ATO). Authentication credentials inherit the trust in the identity from proofing and established credentials. Accordingly, strong proofing (e.g., by automatic data population triggered by sophisticated proofing mechanisms) may result in stronger authentication credentials (e.g., biometrics or other user recognition). In other words, the data obtained during the enrollment process (e.g., phone number, assigned devices, home address) may be used as downstream authentication criteria. Thus, when an enrolled user attempts to subsequently login to an electronic site, the data obtained for enrollment may be used to authenticate the user. For example, if a user attempts to access the electronic site within a geofence surrounding the previously attained home address of the user, this may be a factor that indicates the user is who they say they are. When enough factors are present, the enrollment/authentication services 24 may authenticate the user, establishing access to the electronic site.

In some embodiments, various forms of authenticating data may be solicited for authentication. For example, authentication information can include information that a user knows, such as birthdate, social security number, or other personal information. The authentication information may include confirmation of items in possession by the user (e.g., a known cellular phone, email address, etc.). The authentication information may also include information that indicates who the user is (e.g., biometrics and/or behaviors (e.g., gait observation, observed schedules/patterns of the user identified using one or more smart sensors or other electronic devices, etc.). Authentication of the user may, in some instances, require authentication criteria from multiple buckets (e.g., a combination of authentication criteria that the user knows, authentication of items that the user is known to have, and/or authentication information that indicates who the user is. This may help ensure that if authentication information from one bucket becomes compromised, additional criteria will still supplement authentication accuracy.

In some instances, authentication data may be stored in a blockchain environment for immutable storage of authentication criteria. In some embodiments, multiple blockchains storing authentication criteria (e.g., blockchains provided by third party authentication services) may be linked to provide seamless integration and, thus, authentication using authentication criteria from more than one authenticator.

From time to time, trust must be re-established (e.g., when an identity needs re-established trust, such as when authenticating information is no longer available). Accordingly, recovery actions 68 may be performed. The recovery actions 68 may re-execute the proofing actions 62, such that the user may be re-verified and the enrollment data and authentication criteria is updated.

Figure 3:
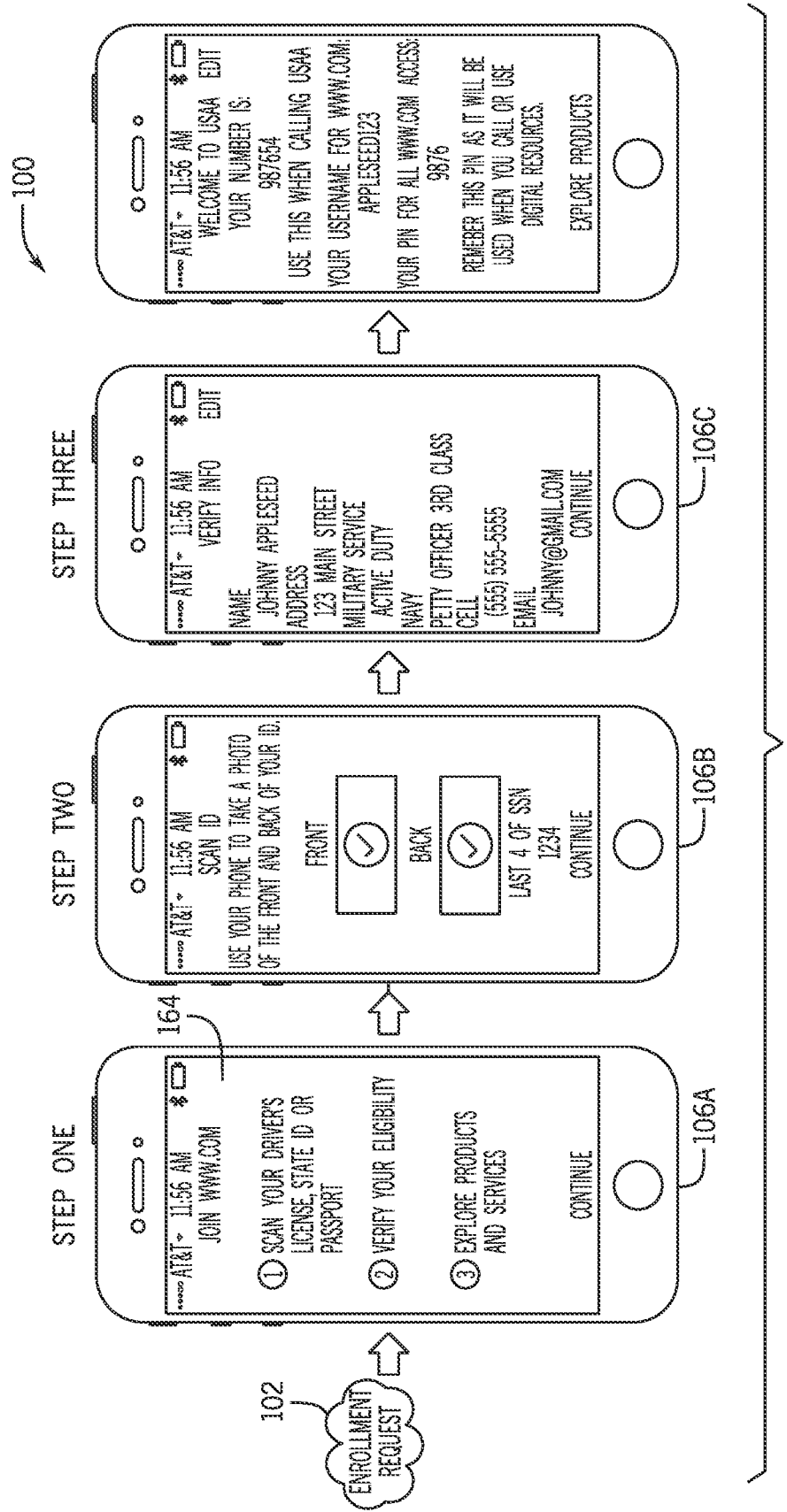
FIG. 3 is a schematic diagram, illustrating a graphical user interface (GUI) progression of an enrollment process that collects a significant amount of data using very few manual inputs from a user, in accordance with an embodiment.

FIG. 3 is a schematic diagram, illustrating a graphical user interface (GUI) progression 100 of an enrollment process that collects a significant amount of data using very few manual inputs from a user, in accordance with an embodiment. The progression is a three-interaction (e.g., three-click) process for enrolling a new member with an electronic site.

As illustrated, the enrollment process begins with the user providing a request 102 to enroll as a member of the electronic site. In response, an enrollment page 104 may be provided in a mobile app. This is depicted in the first progression 106A of the electronic device.

From there, a proofing action may be performed, as illustrated in the second progression 106B of the electronic device. For example, in the depicted embodiment, front and back images of a photo identification (ID) are captured via the app. Further, the last four digits of the user's social security number is also acquired. As may be appreciated, the electronic device may include hardware, such as a camera, capable of attaining the photo ID images.

As may be appreciated, at this point in the progression, very little information has been entered by the user. As an alternative to manual entry of data by a user, which may incorporate fraudulent or erroneous data, the back-end systems (e.g., the enrollment/authentication services 24) may query back-end sources to retrieve relevant information about the user for the enrollment process. This information may be automatically populated without manual interaction. Accordingly, the information may be more accurate and may be pre-verified (e.g., by the back-end sources or by comparing data provided by the one back-end service with data provided by another back-end service, via the enrollment/authentication services 24).

In some embodiments, as depicted in progression 106C, at least a portion of the information may be presented to the user for subsequent verification by the user. Further, some of the information may be locked from additional editing. For example, information that does not typically change over time, such as social security numbers, legal names, etc. may be locked for editing. Other information, such as addresses, email addresses, etc., which may change from time to time, may be editable via the app.

In some embodiments, a confidence score may be generated, indicating how likely the pre-populated information is accurate for the identity associated with the information provided in progression 106B. For example, highly credible back-end systems that maintain fresh data that is routinely updated may have a higher confidence level than other less-frequently updated systems. Accordingly, the confidence score may be impacted based upon the reliability of the source back-end system for the attained information. Further, the confidence score may increase when attained information is consistent across multiple back-end systems. Manual editing of the attained information may lower the confidence score, as the manual entry may introduce typographical errors or may introduce fraudulent data.

Upon verification by the user and, in some embodiment, reaching a satisfactory confidence score via the enrollment/authentication services 24, the member may be enrolled using the relevant data. For example, as depicted in progression 106D, a member number, PIN, username, and other relevant data may be provided to the user. Further, the attained and verified information needed for enrollment may be stored for enrollment.

As may be appreciated, this three click process enhances the user enrollment experience significantly. For example, the number of clicks in an app may be reduced significantly. For example, when enrolling in insurance services, the enrollment progression is reduced from approximately 20 interactions or clicks down to 3. Further, the information attained via the 3 click process may be less prone to typographical errors and/or fraudulent input.

Figure 4:
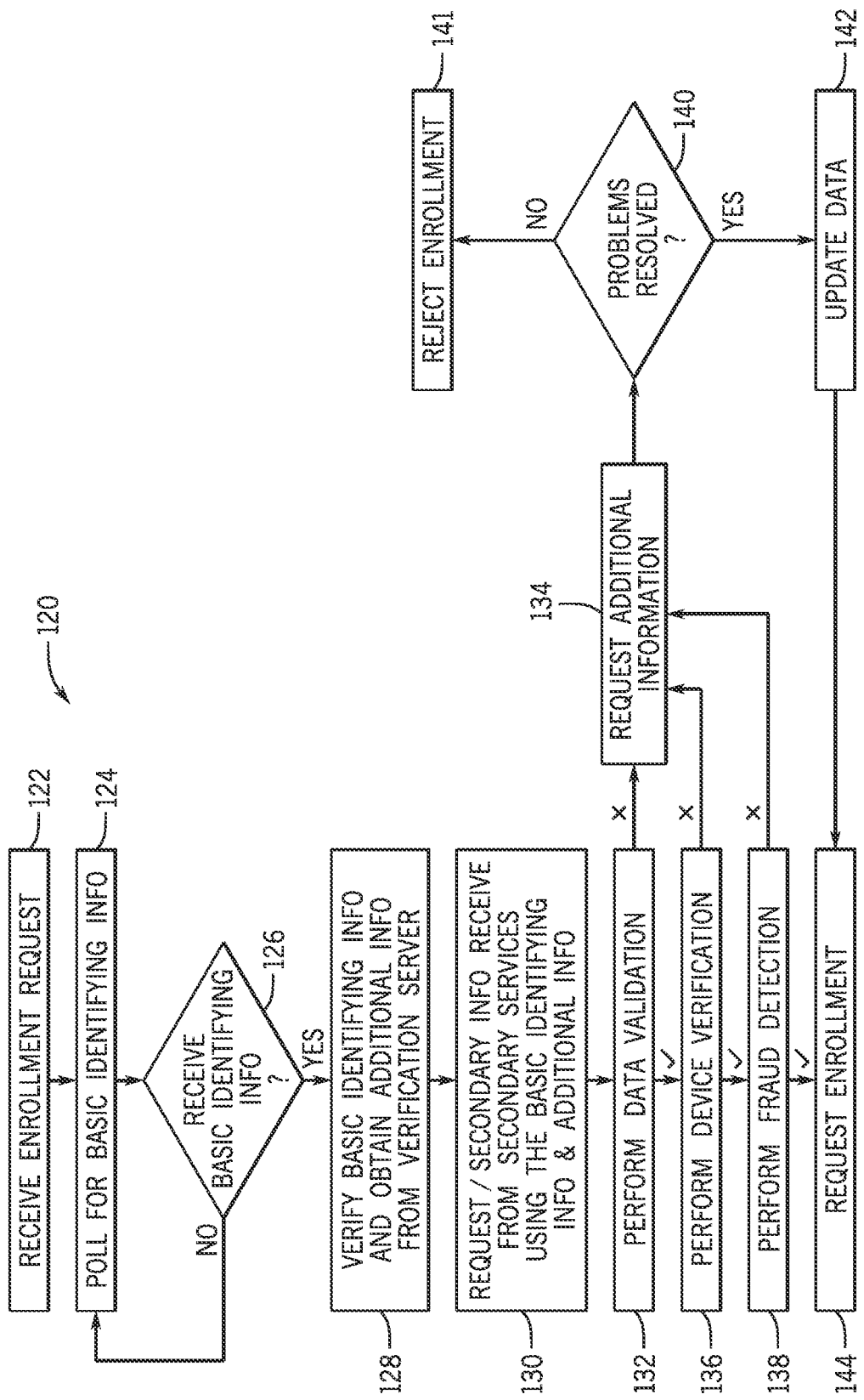
FIG. 4 is a flow chart, illustrating a process for implementing the progression of FIG. 3, in accordance with embodiments described herein.

FIG. 4 is a flow chart, illustrating a process 12 for implementing the progression of FIG. 3, in accordance with embodiments described herein. As mentioned above, an electronic enrollment request is received (block 122). For example, in FIG. 3, the enrollment request 102 is received from a user interacting with a website or electronic device app.

Next, a poll for basic identifying information is provided to the user (block 124). For example, as discussed above with reference to FIG. 3, relevant enrollment information may be obtained using two simple pieces of information (e.g., a photo identification, such as a driver's license, and the last four digits of a social security number). In some embodiments, the photo identification may be captured by the user taking front and back images of the photo identification from the electronic device where the process 12 is initiated.

Upon receiving the basic identifying information (decision block 126), the basic identifying information is verified and additional information is obtained from the verification services (block 128). For example, the photo ID images may be sent to identification recognition services (e.g., the License/Base Data Verification service 18 of FIG. 1, such as Lexis/Nexis or Morpho Trust) for verification of the photo identification. To verify the photo IDs, these services may detect the presence of expected watermarks, may detect unauthorized editing of the photos, may detect whether the information provided by the photo ID is valid, etc. Additional relevant information associated with the photo identification (e.g., address, name, birthdate) may be provided back from these identification recognition services.

The data returned from these services and the last four digits of the social security number entered by the user may be provided to other services (e.g., the identity analytics services 22, the military verification service 26, the device identification validation service 30, the email risk assessment service 34) to validate and/or request other relevant information for the enrollment (block 130). For example, a full social security number may be provided from identification analytics services, such as Experian, based upon the information received from the identification recognition services. The identification analytics services may check for fraudulent activity associated with a provided identity. Further, additional data related to the provided identity may be provided (e.g., a full social security number). Further, to prove that driver's licenses and IDs were not stolen and/or relate to a user, a biometric check (e.g., face capture and comparison to submitted items) may be employed.

Similarly, military service verification may be provided via military verification services, such as the ID.Me service. Such services may provide an indication of whether a provided identity is listed as a current or previous member of the military, rank information, discharge status (e.g., honorably or dishonorably discharged), etc. This information may be useful, as certain enrollment benefits may be available only to certain users with particular military service credentials.

Device ownership verification may be provided by requesting such verification from device service providers (e.g., cellular data providers) and/or a mobile identity services that provide associations between users/user accounts and mobile devices/mobile device accounts(e.g., Danal), etc.

Verification checks for the acquired information may be performed using provider (e.g., healthcare provider) data verification services, such as the Lexis/Nexis service. These services store provider data, which can be validated against acquired enrollment data.

Fraud screening may be performed using fraud screening services, such as Early Warning Services. Fraud screening services attempt to identify any fraudulent activity that has been reported with regard to supplied identity data. For example, these services may identify fraudulently opened accounts associated with a social security number, e-mail address, etc. Additionally, global positioning of the location where the user is requesting enrollment may be tracked (e.g., via GPS of the device running the mobile device). This information may be used as a further indication of confidence of a lack of fraud. For example, if the location data indicates that a user is making a request from a location (e.g., street address, city, state, and/or country) that is not affiliated with the user, as indicated by the acquired data, the confidence score may drop.

As data is received from the various services, it is accumulated for enrollment submission. The process 120 may include data validation (block 132). For example, a comparison of attained data between two or more data source services may indicate a data integrity issue that is likely not associated with fraud. After all identity data (IDs, back-end data, location, etc.) is gathered, the data may be fed into a machine-learning model. The machine-learning model may score a likelihood that the party is who they claim to be, by correlating/comparing the data to identify patterns/combinations of data that indicate whether the user is who they say they are.

As a second validation step, when additional confidence is needed (e.g., when a calculated confidence score does not reach a confidence threshold value), device verification (block 136) may be performed. For example, a PIN may be pushed to the electronic device to confirm that the user is in possession of the device. Additionally and/or alternatively, device identity validation services 30 may provide validation information indicating whether the electronic device is associated with the user (e.g., based upon cellular accounts).

During validation, a digital identity that can be used whenever the user needs to provide electronic identity information may be generated. For example, a blockchain ID may be established during validation. The blockchain ID may be used to provide a digital identity for electronic transactions, such as retail, healthcare, financial, or other electronic transactions by providing the blockchain ID.

Further, other fraud detection (block 138) may be implemented. For example, an email risk assessment may be performed using email profiling services, such as Emailage. These services may maintain profile information associated with email addresses, enabling provision of a fraud risk score associated with an email address. This email risk assessment may contribute to the confidence score, indicating the likelihood that an email address associated with the enrollment is fraudulent.

In situations where any of the validation checks of blocks 132, 136, and 138 reduce the confidence score, additional information may optionally be requested (block 134). For example, when two services provide conflicting information in block 132, a graphical user interface may be provided to the user to validate which, if any, of the information is valid. Overlapping matching information may be used to provide confidence of the identity of the user. Further, when device validation of block 136 fails and/or when potential fraud is detected in block 138, additional information may optionally be request (block 134).

If the problems associated with the validation checks are not resolved (decision block 140), the enrollment may be rejected (block 141). For example, the enrollment data may be provided to a support desk for further inquiry. Alternatively, when the problems are resolved by the requested additional data of block 134, the attained data of blocks 128 and 130 that is modified based upon block 134 may be updated (block 142).

After the data is updated in block 142 or if none of the validation checks result in a reduced confidence score, the enrollment may be requested (block 144). For example, as illustrated in progression 106D of FIG. 3, enrollment data is returned to the user after the enrollment is requested and implemented with the online services. To encourage secure mobile use, the enrollment data may include security defaults, such as enrollment in biometric authentication, PIN validation, and multi-factor authentication. Enrollment confirmation emails and/or push messages may be provided to the user electronically.

As may be appreciated, the current techniques are not limited to the example provided in FIG. 3. For example, such proofing and authentication techniques, in some embodiments, may facilitate smart device (e.g., Internet of Things or "IoT") environments such as a smart home or a connected car environment. By maintaining strong proofing mechanisms to identify strong authentication criteria, a trusted command and control infrastructure for these environments may be facilitated. In one embodiment, a secure IoT platform uses the proofing and authentication techniques described herein for identifying and authenticating a requestor of access to protected data and/or interaction with IoT devices and, upon authentication of the requestor, provide the access and/or interaction. The secure IoT platform may provide secure interactions and fine-grained IoT device access along with blockchain-based authentication, which provides even stronger authentication criteria for authenticating a requestor.

As may be appreciated, the IoT platform (or another network-based platform that uses the techniques described herein) may provide enhanced end-point network security by authenticating requestors that implement network transactions. The platform may be communicatively coupled to an Internet Service Provider (ISP)/Aggregator, which is connected to a secure hub of the IoT environment. Th secure hub may be setup via a plug and play technique where the user connects the secure hub to the ISP's router, A request is sent to the ISP cloud, requesting that the secure hub service as a security gateway device for the IoT environment. The security gateway device may monitor incoming and/or outgoing network traffic and allow or deny network access in and/or out based upon defined security rules. The security rules may be established, at least in part, based upon the authentication criteria established by the platform. For example, the platform may periodically provide authentication criteria back to the secure hub, enabling the secure hub to utilize the authentication criteria in its security rules. This may result in automated provision of personalized security rules for the security gateway, as opposed to manual personalization and/or generic automated provision of rules, which are far more cumbersome to implement and/or less secure.

The current techniques bind proofing, enrollment, and authentication into a joint task, strengthening each of these processes. In particular, user enrollment information may be obtained via proofing tools and enrollment information may be used to authenticate the user. Thus, with very little effort, a user may be proofed, enrolled, and authenticated.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A processor-implemented method, comprising:
receiving identification data from a user via an electronic device;
providing the identification data to a first service provider to obtain a first set of data associated with the identification data, wherein the first service provider is a provider other than the user;
in response to providing the identification data to the first service provider, receiving the first set of data from the first service provider;
in response to receiving the first set of data, providing the identification data, the first set of data, or both to a second service provider other than the user to obtain a second set of data associated with the identification data, the first set of data, or both;
obtaining the second set of data;
calculating a confidence level that the first set of data and the second set of data are associated with the user based upon identifying an amount of data matching, mismatching, or both, data field values between the first set of data and the second set of data; and
performing data validation by comparing the confidence level with a confidence threshold to determine whether there is sufficient confidence in the first set of data and the second set of data.

2. The processor-implemented method of claim 1, comprising receiving the identification data from the user in response to receiving a request for enrollment, verification, or authentication via an application.

3. The processor-implemented method of claim 2, comprising providing a graphical user interface (GUI) requesting identification data from the user based on receiving the request for enrollment, verification, or authentication.

4. The processor-implemented method of claim 2, wherein receiving the identification data from the user in response to receiving the request for enrollment, verification, or authentication via the application comprises receiving a request to access to protected data associated with an Internet-of-Things environment.

5. The processor-implemented method of claim 2, wherein receiving the identification data from the user in response to receiving the request for enrollment, verification, or authentication via the application comprises receiving a request to interact with one or more devices associated with an Internet-of-Things environment.

6. The processor-implemented method of claim 5, comprising, in response to determining that there is sufficient confidence in the first set of data and the second set of data, automatically granting the request to interact with the one or more devices.

7. The processor-implemented method of claim 5, comprising, in response to determining that there is insufficient confidence in the first set of data and the second set of data, denying the request to interact with the one or more devices, triggering manual intervention, or both.

8. The processor-implemented method of claim 1, wherein the data validation is performed in order to determine whether the first set of data and the second set of data pertain to the user.

9. The processor-implemented method of claim 1, comprising:
performing authentication that the electronic device is associated with the user when the confidence level does not exceed the confidence threshold; and
upon passing the authentication, increasing the confidence level.

10. A system, comprising:
a mobile device; and
a platform server, wherein the platform server is configured to:
receive identification data associated with a user from the mobile device;
provide at least a portion of the identification data to a first service provider, wherein the first service provider is a provider other than the user;
obtain, from the first service provider, a first set of relevant data associated with at least a portion of the identification data;
provide the at least a portion of the identification data, at least a portion of the first set of relevant data, or both to a second service provider, wherein the second service provider is a provider other than the user;
obtain, from the second service provider, a second set of relevant data, the second set of relevant data associated with the at least a portion of the identification data, the at least a portion of the first set of relevant data, or both;
calculate a confidence level of the first set of relevant data and the second set of relevant data based upon an amount of data matching, mismatching, or both, data field values between the first set of relevant data and the second set of relevant data; and
perform data validation by comparing the confidence level with a confidence threshold to determine whether there is sufficient confidence that the first set of relevant data matches the second set of relevant data.

11. The system of claim 10, comprising a plurality of Internet-of-Things (IoT) smart devices configured to communicatively couple to the platform server.

12. The system of claim 11, wherein the platform server is configured to enable the user to interact with one or more of the plurality of IoT smart devices, access protected data associated with the one or more of the plurality of IoT smart devices, or both.

13. The system of claim 12, wherein the platform server is configured to, in response to determining that there is sufficient confidence in the first set of relevant data and the second set of relevant data, enable the user to interact with the one or more of the plurality of IoT smart devices, access the protected data associated with the one or more of the plurality of IoT smart devices, or both.

14. The system of claim 12, wherein the platform server is configured to, in response to determining that there is insufficient confidence in the first set of relevant data and the second set of relevant data, refrain from enabling the user to interact with the one or more of the plurality of IoT smart devices or access the protected data associated with the one or more of the plurality of IoT smart devices, triggering manual intervention, or both.

15. The system of claim 12, wherein the platform server is configured to:

receive a request for the user to interact with the one or more of the plurality of IoT smart devices, access the protected data associated with the one or more of the plurality of IoT smart devices, or both via an application running on the mobile device, and provide a graphical user interface (GUI) requesting the identification data.

16. The system of claim 10, wherein the platform server is configured to validate ownership of the mobile device by the user by:

providing a validation request to a mobile device usage service that identifies an owner, user, or both of a particular mobile device; and receiving a response to the validation request, the response indicating whether the user is an owner, user, or both of the mobile device.

17. A tangible, non-transitory, machine-readable medium, comprising machine-readable instructions that, when executed by one or more processors of the machine, cause the machine to:

receive identification data from a user via a mobile device;

provide the identification data to a first service provider, wherein the first service provider is a provider other than the user;

in response to providing the identification data, obtain a first set of relevant data associated with the identification data;

in response to receiving the first set of relevant data, provide the identification data, at least a portion of the first set of relevant data, or both, to a second service provider;

in response to providing the identification data, the at least a portion of the first set of relevant data, or both, obtain a second set of relevant data associated with the identification data, the first set of relevant data, or both from the second service provider, wherein the second service provider is a provider other than the user;

calculate a confidence level that the first set of relevant data and the second set of relevant data are associated with the user based upon determining an amount of data matching, mismatching, or both, data field values between the first set of relevant data and the second set of relevant data; and perform data validation by comparing the confidence level with a confidence threshold to determine whether there is sufficient confidence in the first set of relevant data and the second set of relevant data.

18. The machine-readable medium of claim 17, comprising machine-readable instructions that, when executed by the one or more processors, cause the machine to:

identify a location of the mobile device using a global positioning system of the mobile device;

perform authentication that the location of the mobile device is associated with the user when the confidence level does not exceed the confidence threshold;

upon passing the authentication, increase the confidence level.

19. The machine-readable medium of claim 17, comprising machine-readable instructions that, when executed by the one or more processors, cause the machine to:

during the data validation, generate a blockchain ID, wherein the blockchain ID provides validation that the first set of relevant data and the second set of relevant data pertain to the user.

20. The machine-readable medium of claim 17, comprising machine-readable instructions that, when executed by the one or more processors, cause the machine to:

in response to determining that there is sufficient confidence in the first set of relevant data and the second set of relevant data, enable the user to interact with one or more of a plurality of IoT smart devices or access protected data associated with the one or more of the plurality of IoT smart devices; and in response to determining that there is insufficient confidence in the first set of relevant data and the second set of relevant data, refrain from enabling the user to interact with the one or more of the plurality of IoT smart devices or access the protected data associated with the one or more of the plurality of IoT smart devices.

* * * * *